United States Patent
Zheng et al.

(10) Patent No.: US 12,159,649 B2
(45) Date of Patent: Dec. 3, 2024

(54) MULTIMEDIA PROCESSING METHOD AND APPARATUS, ELECTRONIC DEVICE, AND STORAGE MEDIUM

(71) Applicant: LEMON INC., Grand Cayman (KY)

(72) Inventors: Xin Zheng, Beijing (CN); Conghui Zhu, Los Angeles, CA (US); Rui Xia, Los Angeles, CA (US); Chuxiang Shang, Beijing (CN); Dejian Zhong, Beijing (CN); Yongsen Jiang, Beijing (CN); Ming Tu, Los Angeles, CA (US); Lelai Deng, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/535,891

(22) Filed: Dec. 11, 2023

(65) Prior Publication Data

US 2024/0105234 A1 Mar. 28, 2024

Related U.S. Application Data

(63) Continuation of application No. PCT/SG2022/050494, filed on Jul. 14, 2022.

(30) Foreign Application Priority Data

Jul. 15, 2021 (CN) .......................... 202110802038.0

(51) Int. Cl.
*G11B 27/031* (2006.01)
*G10L 15/05* (2013.01)
(Continued)

(52) U.S. Cl.
CPC ............ *G11B 27/031* (2013.01); *G10L 15/05* (2013.01); *G10L 15/1815* (2013.01); *G10L 25/57* (2013.01); *G10L 25/78* (2013.01)

(58) Field of Classification Search
CPC ... G11B 27/031; G10L 15/05; G10L 15/1815; G10L 25/57; G10L 25/78
See application file for complete search history.

(56) References Cited

U.S. PATENT DOCUMENTS

2007/0219778 A1 9/2007 Whittaker et al.
2014/0207449 A1 7/2014 Johnson et al.
(Continued)

FOREIGN PATENT DOCUMENTS

CN 102685151 A 9/2012
CN 202502737 U 10/2012
(Continued)

OTHER PUBLICATIONS

International Search Report (with English translation) and Written Opinion issued in PCT/SG2022/050494, dated Jan. 26, 2023, 12 pages provided.
(Continued)

*Primary Examiner* — Mishawn N. Hunter
(74) *Attorney, Agent, or Firm* — HSML P. C.

(57) ABSTRACT

According to the embodiments of the disclosure, a multimedia processing method, device, electronic device, and storage medium are provided by obtaining a first multimedia resource; determining an initial text content corresponding to the first multimedia resource by performing speech recognition on audio data of the first multimedia resource, the audio data of the first multimedia resource comprises speech data of the initial text content; determining an invalid text content in the initial text content, the invalid text content is semantically non-informative; determining a first playing position of speech data of the invalid text content in the first multimedia resource; and cropping the first multimedia resource based on the first playing position to obtain a second multimedia resource, wherein audio data of the second multimedia resource comprises speech data of a target text content but does not comprise the speech data of the invalid text content.

19 Claims, 10 Drawing Sheets

(51) Int. Cl.
*G10L 15/18* (2013.01)
*G10L 25/57* (2013.01)
*G10L 25/78* (2013.01)

(56) References Cited

U.S. PATENT DOCUMENTS

2019/0215464 A1* 7/2019 Kumar ............... H04N 7/08
2021/0397846 A1* 12/2021 Chang ............... A63F 13/828
2022/0068258 A1* 3/2022 Jindal ............... G10L 25/57

FOREIGN PATENT DOCUMENTS

| CN | 108259965 A | 7/2018 |
| CN | 109241332 A | 1/2019 |
| CN | 110297907 A | 10/2019 |
| CN | 110853621 A | 2/2020 |
| CN | 112256836 A | 1/2021 |
| CN | 112733654 A | 4/2021 |

OTHER PUBLICATIONS

The extended European search report issued in European Application No. 22842574.0, dated Aug. 27, 2024.

* cited by examiner

MULTIMEDIA PROCESSING METHOD AND APPARATUS, ELECTRONIC DEVICE, AND STORAGE MEDIUM

CROSS REFERENCE TO RELATED APPLICATIONS

The application is a continuation of International Patent Application No. PCT/SG2022/050494, filed on Jul. 14, 2022, which claims the benefit of Chinese Patent Application No. 202110802038.0 filed on Jul. 15, 2021, entitled "MULTIMEDIA PROCESSING METHOD, DEVICE, ELECTRONIC DEVICE AND STORAGE MEDIUM", which is hereby incorporated by reference in its entirety.

TECHNICAL FIELD

Embodiments of the present disclosure generally relate to the field of computer technology and in particular, to a multimedia processing method, device, electronic device, and storage medium.

BACKGROUND

Nowadays, with the rapid development of multimedia production software and multimedia production platforms, technical difficulty, and threshold for the public to produce multimedia resources have been greatly reduced, causing multimedia-based content creation, and sharing to enter the stage of universalization. In the process of multimedia resources production, in order to make the multimedia resources better expressive, it is often necessary for the author to post-crop the multimedia resources after recording and remove the audio or video segments that are not smooth or incorrect, such as speech errors, pauses, etc., so as to improve overall playing fluency of the multimedia resources.

However, in prior art, the process of cropping multimedia resources to improve the overall playing smoothness of multimedia resources can only be manually processed through professional editing tools, which is professionally demanding and difficult to operate, resulting in problems of low efficiency and poor effectiveness in the cropping process of multimedia resources, as well as low playing smoothness of the cropped multimedia resources.

SUMMARY

According to the embodiments of the present disclosure, a multimedia processing method, device, electronic device, and storage medium are provided to overcome the problems of low efficiency and poor effectiveness in the cropping process of multimedia resources, as well as low playing smoothness of the cropped multimedia resources.

In a first aspect, a multimedia processing method is provided in embodiments of the present disclosure. The method comprises:

obtaining a first multimedia resource; determining an initial text content corresponding to the first multimedia resource by performing speech recognition on audio data of the first multimedia resource, wherein the audio data of the first multimedia resource comprises speech data of the initial text content; determining an invalid text content in the initial text content, wherein the invalid text content is semantically non-informative; determining a first playing position of the speech data of the invalid text content in the first multimedia resource; cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content.

In a second aspect, a multimedia processing apparatus is provided in embodiments of the present disclosure. The multimedia processing apparatus comprises:

a speech recognition module configured to obtain a first multimedia resource, and determine an initial text content corresponding to the first multimedia resource by performing speech recognition on the audio data of the first multimedia resource, wherein the audio data of the first multimedia resource comprises speech data of the initial text content;

a first confirmation module configured to determine the invalid text content in the initial text content, wherein the invalid text content is semantically non-informative;

a second confirmation module configured to determine the first playing position of the speech data of the invalid text content in the first multimedia resource;

a generation module configured to crop the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content.

In a third aspect, embodiments of the present disclosure provide an electronic device comprises: at least one processor and memory;

the memory storing computer-executable instructions;

the at least one processor executing the computer-executable instructions stored in the memory to cause the at least one processor to implement the multimedia processing method according to the above first aspect and various possible designs of the first aspect.

In a fourth aspect, a computer-readable storage medium is provided in embodiments of the present disclosure, wherein the computer-readable storage medium stores computer-executable instructions, that, when executed by a processor, implements the multimedia processing method according to the first aspect and various possible designs of the first aspect.

In a fifth aspect, a computer program product is provided in embodiments of the present disclosure, comprising a computer program, which, when executed by a processor, implements the method according to the first aspect and various possible designs of the first aspect.

In a sixth aspect, a computer program is provided in embodiments of the present disclosure, wherein the computer program, when executed by a processor, implements the method according to the first aspect and various possible designs of the first aspect.

According to the embodiments of the present disclosure, a multimedia processing method, device, electronic device, and storage medium are provided, by obtaining a first multimedia resource; determining an initial text content corresponding to the first multimedia resource by performing speech recognition on audio data of the first multimedia resource, wherein the audio data of the first multimedia resource comprises speech data of the initial text content;

determining an invalid text content in the initial text content, wherein the invalid text content is semantically non-informative; determining a first playing position of the speech data of the invalid text content in the first multimedia resource; and cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content. Based on the speech recognition and word processing of the first multimedia resource, the automatic positioning and cropping of the invalid text content in the first multimedia resource is implemented, and the efficiency and the effect of cropping the invalid content in the multimedia resource are improved, as well as the playing fluency of the cropped multimedia resources.

BRIEF DESCRIPTION OF THE DRAWINGS

In order to provide a clearer explanation of the embodiments of the present disclosure or technical solutions in the prior art, a brief introduction will be given to the accompanying drawings required in the description of the embodiments or prior art. Obviously, the accompanying drawings in the following description are some embodiments of the present disclosure. For the ordinary skill in the art, other accompanying drawings can be obtained based on these drawings without any creative labor.

DETAILED DESCRIPTION

In order to make the purpose, technical solution, and advantages of the embodiment of the present disclosure clearer, the technical solutions. In this embodiment of the present disclosure will be described clearly and completely in the following in conjunction with the accompanying drawings. In this embodiment of the present disclosure. Obviously, the described embodiments are a part of the embodiments of the present disclosure, not all of the embodiments. Based on the embodiments of the present disclosure, all other embodiments obtained by ordinary skill in the art without creative labor fall within the scope of protection of the present disclosure.

Figure 1:
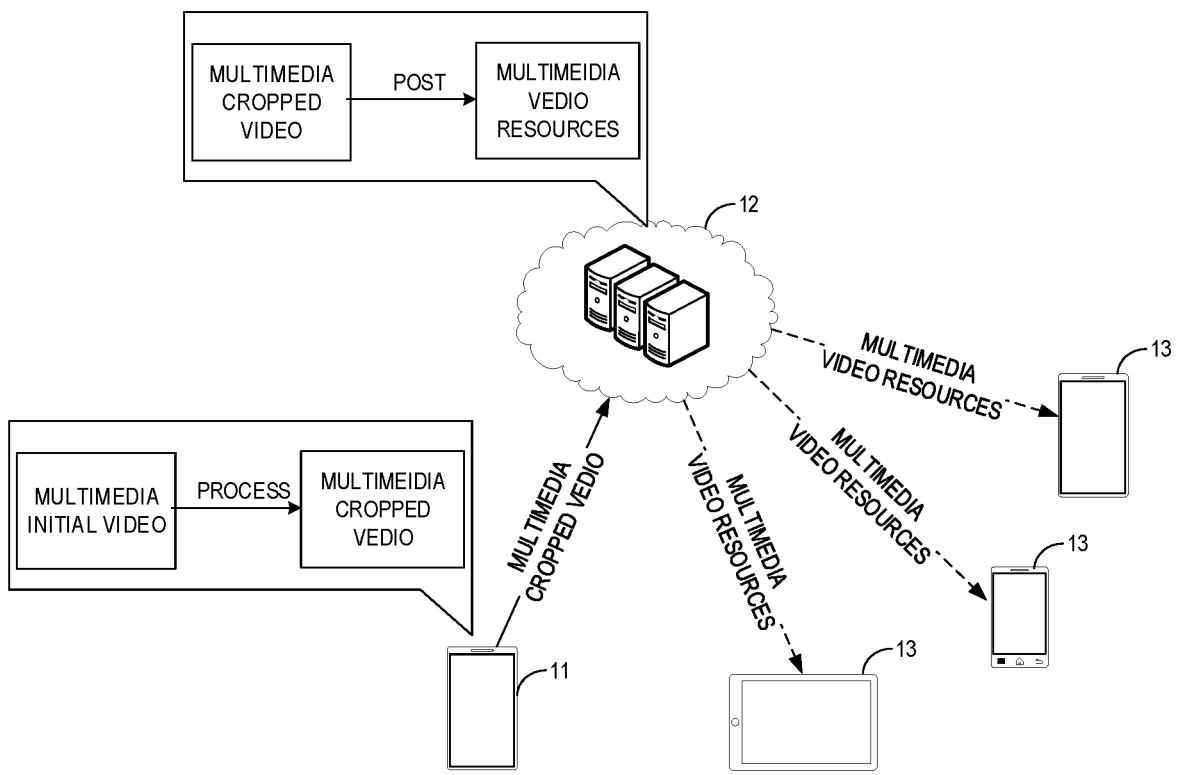
FIG. 1 illustrates a diagram of one application scenario of multimedia processing method provided by embodiments of the present disclosure.

The application scenarios of the embodiments of the present disclosure will be explained in more details below:

FIG. 1 illustrates a diagram of one application scenario of multimedia processing method provided by embodiments of the present disclosure. The multimedia processing method provided by the present embodiment can be applied to the application scenario of post-cropping processing of multimedia video resources after recording. For example, the multimedia video resources are videos containing audio tracks. Specifically, the method provided by the present embodiment can be applied to terminal devices, as shown in FIG. 1, After the user records a multimedia initial video through terminal device 11, the terminal device 11 processes the multimedia initial video by executing the multimedia processing method provided in this embodiment, automatically removing the video and audio segments corresponding to meaningless content such as verbal errors, pauses, and verbal language in the multimedia initial video, and generating a multimedia cropped video. Due to the removal of meaningless content from multimedia cropped videos, compared to the initial multimedia video, multimedia cropped videos are more coherent and smoother in content, and the content quality of multimedia video resources is higher. Afterward, the terminal device 11 sends the multimedia cropped video to video platform server 12, which posts the multimedia cropped video as a multimedia video resource on the video platform. Other terminal devices 13 can achieve viewing of the multimedia video resource through communication with the video platform server 12.

Figure 2:
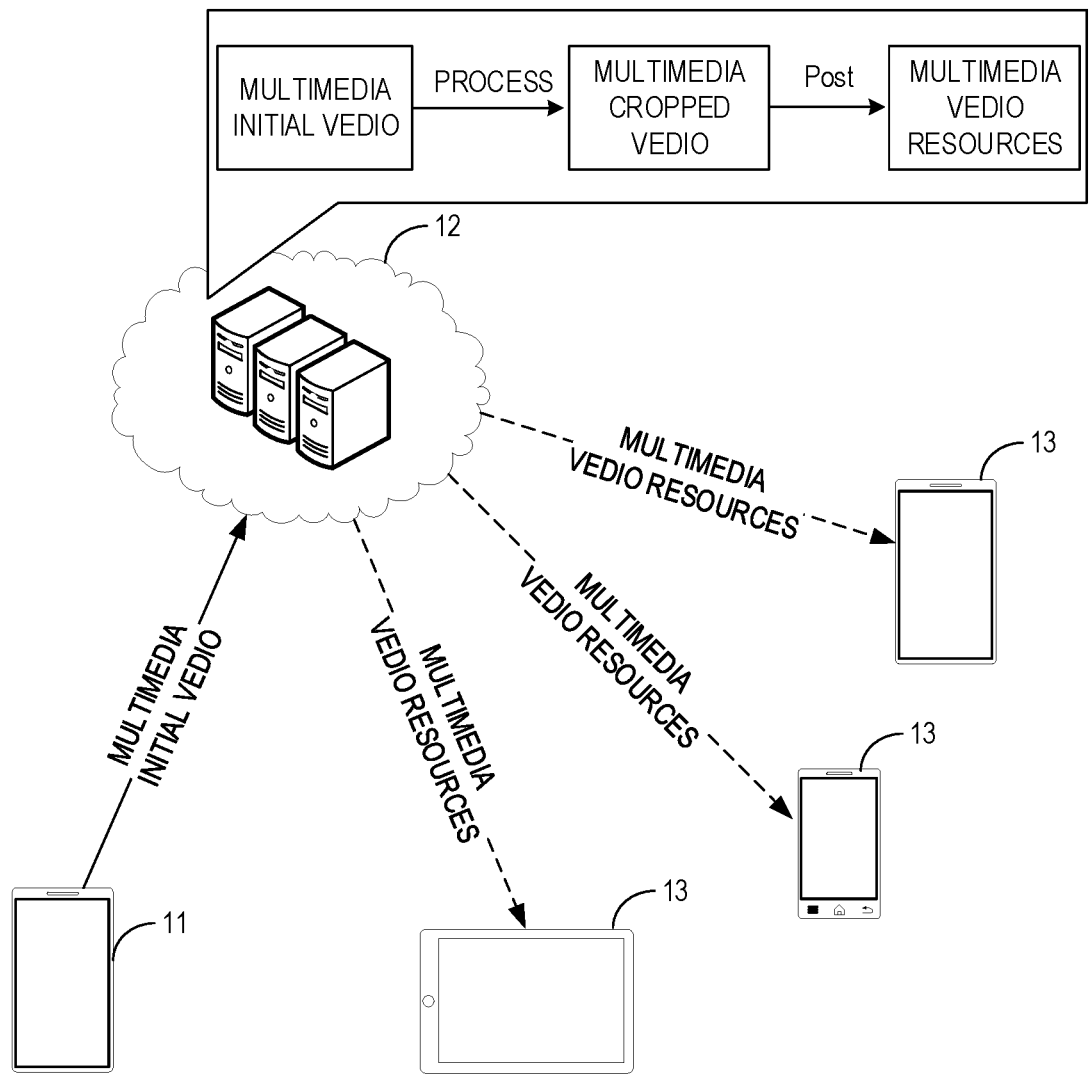
FIG. 2 illustrates a diagram of another application scenario of multimedia processing method provided by embodiments of the present disclosure.

FIG. 2 illustrates a diagram of another application scenario of multimedia processing method provided by embodiments of the present disclosure. In a possible implementation, the method provided In this embodiment of the present disclosure can also be applied to a video platform server, wherein a user records a multimedia initial video through a terminal device and sends the multimedia initial video to the video platform server, which executes the multimedia processing method provided by the present embodiment to generate a multimedia cropped video, as shown in FIG. 1, and post the multimedia cropped video as a multimedia video resource on the video platform. Other terminal devices can realize the viewing of the multimedia video resource by communicating with the video platform server.

In prior art, the process of cropping multimedia resources to improve the overall playing smoothness of multimedia resources can only be manually processed through professional editing tools, which is professionally demanding and difficult to operate, resulting in problems of low efficiency and poor effectiveness in the cropping process of multimedia resources, as well as low playing smoothness of the cropped multimedia resources. This is because multimedia resources recorded by users themselves are difficult to accurately identify and locate meaningless content in multimedia resources due to differences in pronunciation wordlists, language expression styles of different users, and content differences in multimedia resources. Therefore, usually, it may only rely on a manual combination of the picture and speech of the multimedia resources, and after a comprehensive judgment, manual cropping is not only inefficient but also affects the smoothness of the cropped multimedia resources.

A multimedia processing method is provided in embodiments of the present disclosure to solve the above problems.

Figure 3:
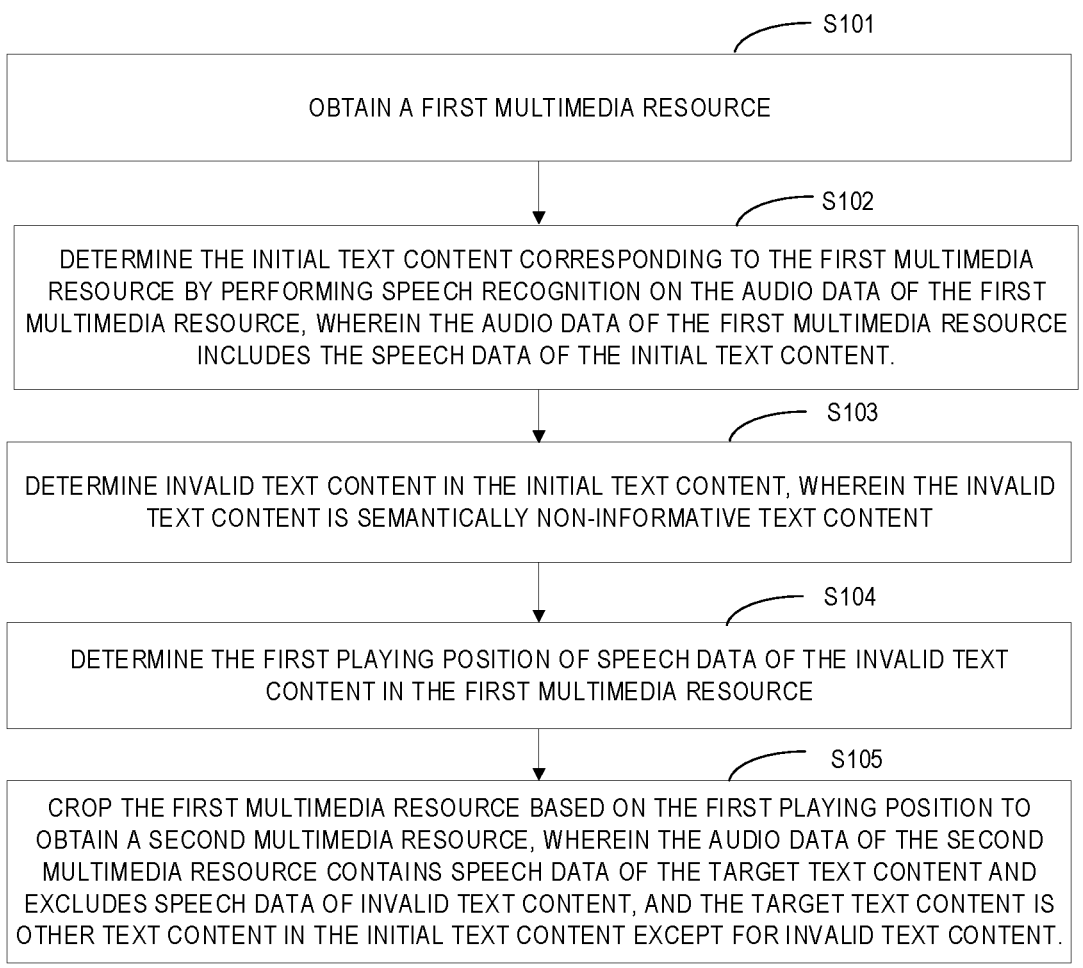
FIG. 3 illustrates a schematic flow diagram of a multimedia processing method provided by an embodiment of the present disclosure.

FIG. 3 illustrates a schematic flow diagram of a multimedia processing method provided by an embodiment of the present disclosure. The method of this embodiment can be applied to a server or terminal device. In the embodiment, the terminal device is exemplarily described as the execution subject of the method of this embodiment, and the multimedia processing method includes:

S101: obtain a first multimedia resource.

Exemplarily, multimedia typically refers to a combination of a plurality of media forms, including text, speech, and images. In computer systems, multimedia refers to a human-machine interactive information exchange and dissemination medium that combines two or more media. In the embodiment, the first multimedia resource can be an audio video with audio tracks, and more specifically, the first multimedia resource can be multimedia resources or files that protect video and audio data.

Further, the first multimedia resource may be an audio video recorded by a user through a terminal device, such as a video recording function of a smartphone. In this embodiment, the audio video is a video containing a human voice, such as commentary videos teaching videos, product introduction videos, etc. Certainly, it is understandable that the first multimedia resource may also be obtained by the terminal device by receiving data transmitted by other electronic devices, and the examples are not given here.

S102: determine the initial text content corresponding to the first multimedia resource by performing speech recognition on the audio data of the first multimedia resource, wherein the audio data of the first multimedia resource includes the speech data of the initial text content.

Exemplarily, the first multimedia resource includes at least audio data. After obtaining the first multimedia resource, speech recognition is performed on the audio data of the first multimedia resource according to a preset algorithm to determine the first multimedia resource. The text corresponding to the content expressed by the audio data in the media resource, i.e. the initial text content. Herein, exemplarily, the audio data may include only speech data, or both speech data and non-speech data, and the speech data is the audio data corresponding to the human voice recorded in the video; correspondingly, the non-speech data refers to the audio data corresponding to non-human voice recorded in the video. More specifically, for example, the first multimedia resource is a product introduction video, wherein the audio data corresponding to the voice of the person introducing the product in the video is speech data. By performing speech recognition on the audio data of the first multimedia resource, the obtained text is the initial text content, which is the text converted from human voice to speech in the video introducing the product.

S103: determine invalid text content in the initial text content, wherein the invalid text content is semantically non-informative text content.

Further, exemplarily, after obtaining the initial text content, the initial text content is recognized based on words, terms, sentences, and paragraphs in the initial text content, and the invalid text content and the target text content therein can be determined. Herein, exemplarily, the invalid text content is semantically non-informative, more specifically, such as abnormal pauses, repetitions, redundant modal particles, and other non-informative in the process of speaking, but which will affect the fluency of language expression.

Exemplarily, there are various ways to determine the implementation of the invalid text content in the initial text content. For example, determine the initial invalid text content in the text content based on preset invalid text content library. Specifically, the invalid text content library includes preset elements such as words, terms, and short sentences corresponding to the invalid text content. Based on the words, terms, and short sentences in the invalid text content library, detect whether the initial text content contains words, terms, and short sentences in the aforementioned invalid text content library, and then determine the invalid text content in the initial text content.

In another possible implementation, perform semantic analysis on the initial text content to obtain semantic information corresponding to the initial text content; and determine the invalid text content in the initial text content according to the semantic information. Specifically, the semantic meaning of each word and word element in the initial text content can be determined by performing semantic analysis on the initial text content. Herein, exemplarily, the invalid text content is also a classification of the semantic meaning. Therefore, through semantic analysis of the initial text content, the invalid text content in the initial text content can be determined.

Herein, semantic analysis of the initial text content can be implemented through pre-trained language processing models. Using and training the language processing models for semantic analysis are known skills in the art and will not be traced here.

S104: determine the first playing position of speech data of the invalid text content in the first multimedia resource.

Exemplarily, each word or word in the initial text content corresponds to an audio segment and an audio data segment. The audio data contains a playing timestamp. After determining the invalid text content in the initial text content, the audio data corresponding to each word or word is determined according to the words or words contained in the invalid text content, and the playing timestamp of the audio data is obtained. Further, the first playing position of speech data with invalid text content in the first multimedia resource may be determined according to the playing timestamp of the audio data. Exemplarily, in a possible implementation, the invalid text content corresponds to continuous audio data segments in the first multimedia resource. In this case, the first playing position may only include a set of playing timestamps containing start points and end points. In another possible implementation, the invalid text content corresponds to a plurality of discontinuous audio data segments in the first multimedia resource. In this case, the first playing position can include a plurality of sets of playing timestamps containing start points and end points.

S105: crop the first multimedia resource based on the first playing position to obtain a second multimedia resource. The audio data of the second multimedia resource contains speech data of the target text content and excludes speech data of invalid text content. The target text content is other text content in the initial text content except for invalid text content.

Exemplarily, after determining the first playing position, it is equivalent to having identified and localized the speech data corresponding to the invalid text content. In order to improve the overall smoothness of multimedia video playing based on the first playing position, the invalid text content corresponding to the speech data is deleted from all audio data of the first multimedia resource, and the speech data corresponding to the target text content is retained, thereby reducing the impact on the expression of the multimedia video content due to words and phrases that are non-informative, such as pauses, repetitions, redundant modal particles. Specifically, the start points and end points of the speech data corresponding to the invalid text content are determined based on the description of the playing position of the speech data corresponding to the invalid text content in the first multimedia resource by the first playing position. Further, the data in the middle of the start points and the end points are deleted, and the speech data of the target text content before the start point and after the end point are spliced to generate the cropped audio data.

Further, in this embodiment, the first multimedia resource also includes video data. Therefore, similarly, based on the first playing position, the video data in the first multimedia resource is processed accordingly, the video data corresponding to invalid text content is cropped, and the cropped video data corresponding to the cropped audio data on the playing timeline is generated. Further, the second multimedia resource is obtained.

Figure 4:
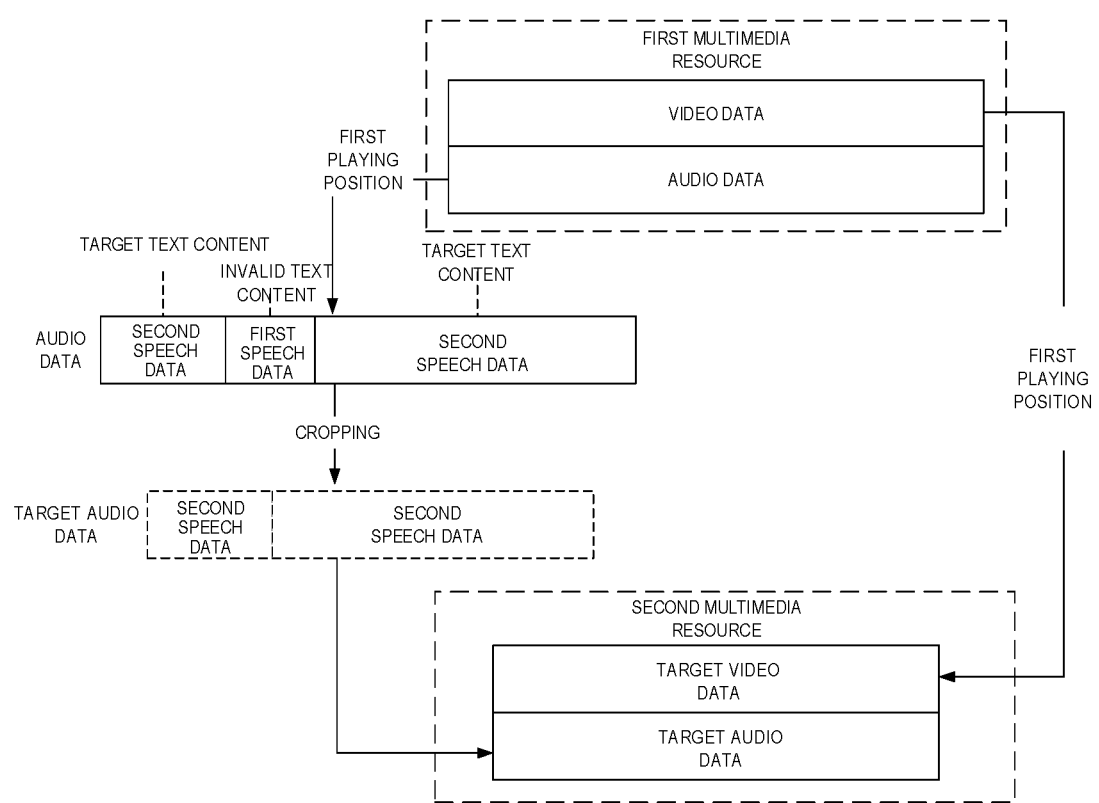
FIG. 4 illustrates a schematic diagram of a process of obtaining a second multimedia resource through a first multimedia resource according to an embodiment of the present disclosure.

FIG. 4 illustrates a schematic diagram of a process of obtaining a second multimedia resource through a first multimedia resource according to an embodiment of the present disclosure. As shown in FIG. 4, the first multimedia resource includes audio data and video data. The audio data includes speech data, and the speech data includes first and second speech data. The first speech data is the speech data corresponding to invalid text content; the second speech data is the speech data corresponding to the target text content. After determining the positions of the first speech data and second speech data in the speech data based on the first playing position, crop the first speech data, retain the second speech data, and re-splice to generate target audio data; correspondingly, the corresponding video data is cropped and concatenated to generate the target video data according to the first playing position. Furthermore, the second multimedia resource is generated according to the target audio data and target video data.

In this embodiment, obtaining a first multimedia resource; determining an initial text content corresponding to the first multimedia resource by performing speech recognition on audio data of the first multimedia resource, wherein the audio data of the first multimedia resource comprises speech data of the initial text content; determining an invalid text content in the initial text content, wherein the invalid text content is semantically non-informative; determining a first playing position of the speech data of the invalid text content in the first multimedia resource; and cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content. Based on the speech recognition and word processing of the first multimedia resource, the automatic positioning and cropping of the invalid text content in the first multimedia resource is implemented, and the efficiency and the effect of cropping the invalid content in the multimedia resource are improved, as well as the playing fluency of the cropped multimedia resources.

Figure 5:
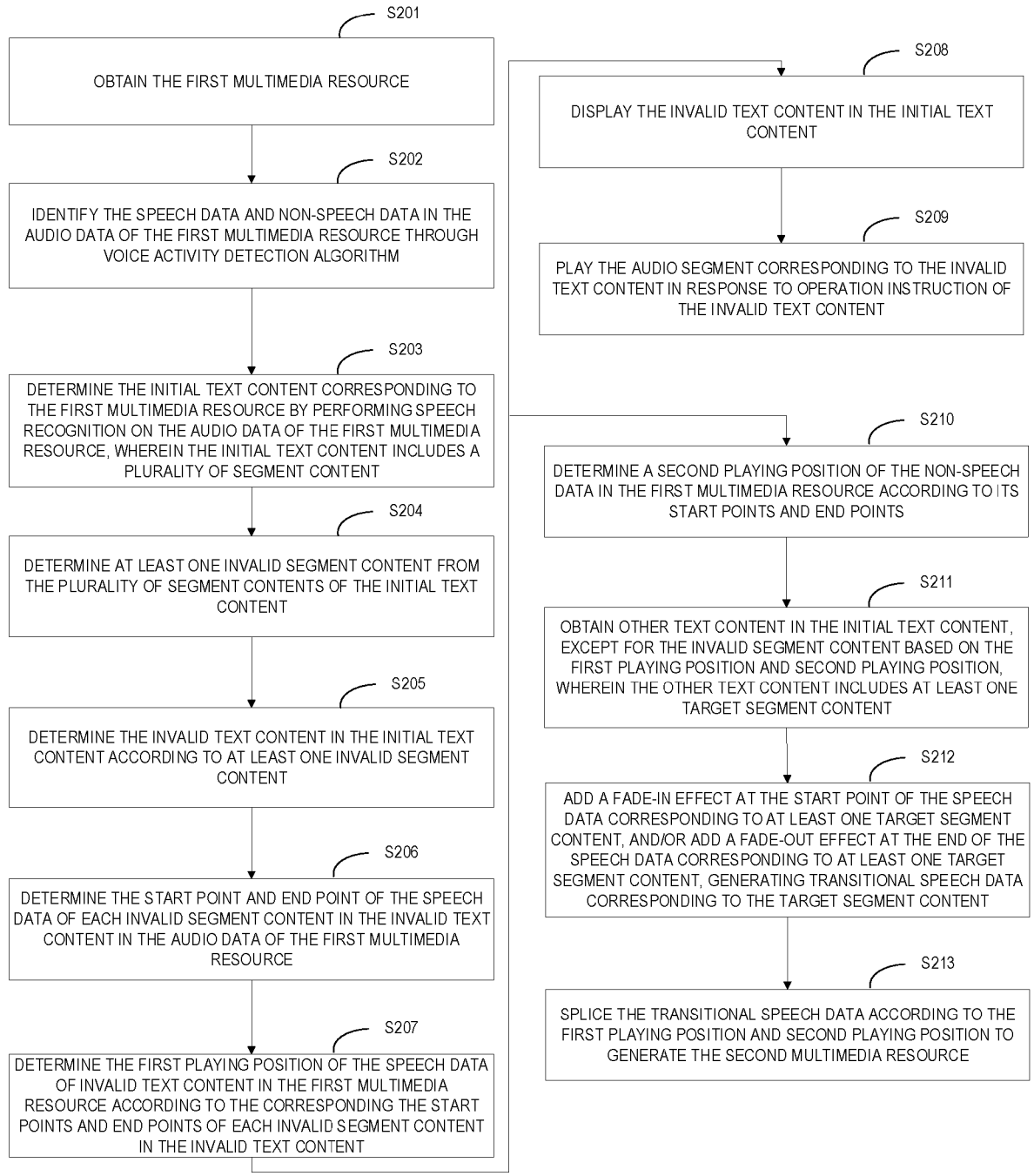
FIG. 5 illustrates a schematic flow diagram 2 of the flow of a multimedia processing method provided by an embodiment of the disclosure.

FIG. 5 illustrates a schematic flow diagram 2 of the flow of a multimedia processing method provided by an embodiment of the disclosure. In this embodiment, steps S102-S105 are further refined on the basis of the embodiment shown in FIG. 3, and the multimedia processing method includes:

S201: obtain the first multimedia resource.

S202: identify the speech data and non-speech data in the audio data of the first multimedia resource through voice activity detection algorithm.

Exemplarily, Voice Endpoint Detection (Voice Activity Detection, VAD) algorithm, also known as Voice Activity Detection, aims to identify silent periods (i.e., non-human voice signals) from a stream of speech signals. In this embodiment, by means of the voice activity detection algorithm, the audio data of the first multimedia resource is processed to identify the speech data corresponding to the human voice and the non-speech data corresponding to the non-human voice, so as to realize the subsequent processing process based on the speech data. Herein the specific implementation method of the voice activity detection algorithm is an existing technology known to those skill in the art, and will not be repeated here.

S203: determine the initial text content corresponding to the first multimedia resource by performing speech recognition on the audio data of the first multimedia resource, wherein the initial text content includes a plurality of segment content.

Figure 6:
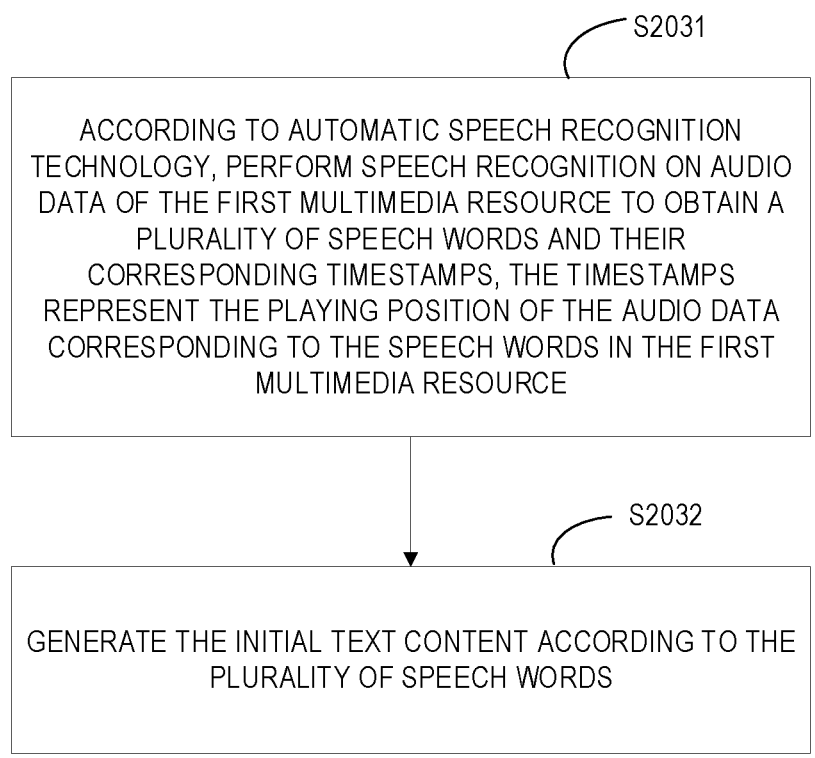
FIG. 6 illustrates a flow diagram of the implementation method of step S203 In this embodiment shown in FIG. 5.

Exemplarily, as shown in FIG. 6, S203 includes two specific implementation steps: S2031 and S2032.

S2031: according to automatic speech recognition technology, perform speech recognition on audio data of the first multimedia resource to obtain a plurality of speech words and their corresponding timestamps. The timestamps represent the playing position of the audio data corresponding to the speech words in the first multimedia resource.

S2032: generate the initial text content according to a plurality of speech words.

Exemplarily, Automatic Speech Recognition (ASR, Automatic Speech Recognition) is a technology that converts human speech into text. It is a technology based on a plurality of technical disciplines such as acoustics, phonetics, linguistics, and computer science. The audio signal is preprocessed, feature extraction, post-processing, feature recognition, and other links to realize the conversion from speech to text. Herein, there are many methods involved in each processing, which are known to those skill in the art. The specific algorithms involved in each processing link can be configured according to specific needs, and we will not illustrate them one by one here.

Furthermore, after automatic speech recognition technology is configured to recognize the audio data of the first multimedia resource, output a word-level recognition result, which is a speech word, wherein each speech word corresponds to a segment of audio data, i.e. an audio segment. According to the playing timing of each audio segment in the audio data of the first multimedia resource, the speech words corresponding to each audio segment are sequentially arranged, and the generated text containing a plurality of speech words is the initial text content. In addition, exemplarily, in the process of recognizing speech words through automatic speech recognition technology, the timestamp corresponding to each speech word will be determined to represent the playing position of the audio data corresponding to the speech word (i.e., the aforementioned speech segment) in the first multimedia resource. This process is implemented through a preset automatic speech recognition algorithm, which will not be repeated here.

Herein, exemplarily, each or more speech words can form a segment of content to represent specific semantics. For example, a word composed of two speech words, or idioms composed of four speech words, etc. As for the invalid text content in the initial text content, it can appear in the form of one single speech word, such as "um", or it can also appear in the form of two speech words, such as "that". The above examples are only for semantically non-informative content that often appears in Chinese speech and are similar to other languages. We will not provide one-by-one examples here.

S204: determine at least one invalid segment content from the plurality of segment contents of the initial text content.

Figure 7:
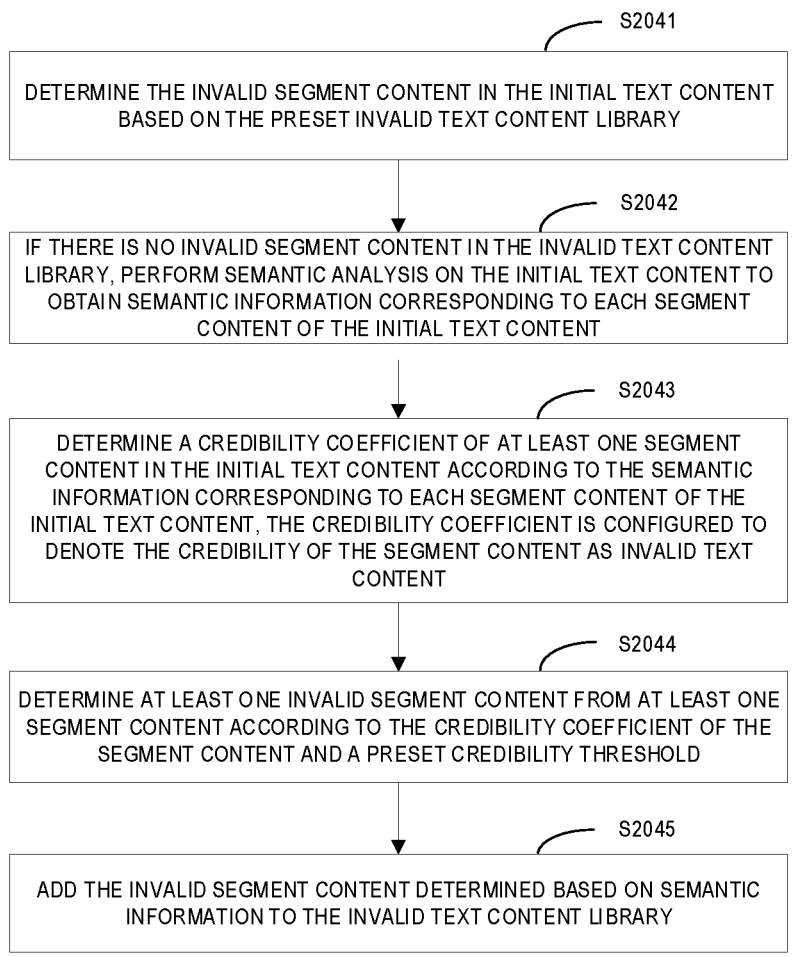
FIG. 7 illustrates a flow diagram of the implementation method of step S204 In this embodiment shown in FIG. 5.

Exemplarily, as shown in FIG. 7, S204 includes five specific implementation steps S2041, S2042, S2043, S2044, and S2045.

S2041: determine the invalid segment content in the initial text content based on the preset invalid text content library.

S2042: if there is no invalid segment content in the invalid text content library, perform semantic analysis on the initial text content to obtain semantic information corresponding to each segment content of the initial text content.

Exemplarily, a plurality of semantically non-informative speech words or combinations of speech words are preset in the invalid text content library. According to the preset in the invalid text content library, the semantically non-informative speech terms and/or combinations are preset. The combination of speech words and consistency detection in the initial text content can determine the same semantically non-informative speech words and/or the combination of speech words in the initial text content, i.e. the invalid segment content. At this point, step S204 can be implemented. Herein, the invalid segment content is determined through the invalid text content library, because the step of semantic analysis is omitted, the efficiency is higher, the computing resources are less occupied, and the efficiency of locating and cropping invalid text content can be improved.

If there is no invalid segment content in the invalid text content library, i.e., according to the preset a plurality of semantically non-informative speech words and/or the combination of speech words in the invalid text content library, after a consistency detection is performed, a plurality of semantically non-informative speech words and/or the combination of speech words preset in the invalid text content library was not detected in the initial text content. Alternatively, if the number of a plurality of semantically non-informative speech words and/or combinations of speech words in the invalid text content library detected in the initial text content is less than the preset value, semantic analysis of the initial text content is performed. The semantic information corresponding to each segment of the initial text content is determined through semantic analysis, and the invalid segment content is determined by semantic information.

S2043: determine a credibility coefficient of at least one segment content in the initial text content according to the semantic information corresponding to each segment content of the initial text content. The credibility coefficient is configured to denote the credibility of the segment content as invalid text content.

S2044: determine at least one invalid segment content from at least one segment of content according to the credibility coefficient of the segment content and a preset credibility threshold.

Exemplarily, after performing semantic analysis on the content of each segment of the initial text content based on a preset semantic analysis algorithm or model, the output speech information includes confidence of the semantic type corresponding to the content of the segment, and the confidence represents the semantics The analysis model evaluates the credibility of the semantic classification results of the segment content, i.e. the confidence is the credibility coefficient. The higher the credibility coefficient, the more credible the semantic type corresponding to the segment content. And "Invalid content" also corresponds to a semantic classification. In the process of determining the semantic classification of "invalid content", through the credibility coefficient of the segment content and the preset credibility threshold, the segment content corresponding to the credibility coefficient which is larger than the credibility threshold is determined to be the semantic classification of the "invalid content", i.e. invalid segment content.

In the steps of this embodiment, the credibility coefficient of each segment content is configured to determine the invalid segment content, which can improve the recognition accuracy of invalid segment content and reduce misjudgment.

S2045: add the invalid segment content determined based on semantic information to the invalid text content library.

Exemplarily, after the invalid segment content is determined by speech information, the invalid segment content is added to the invalid text content library because the invalid text library does not include the words or combinations of words corresponding to the above invalid segment content, so as to expand the content of the invalid text content library and improve the accuracy and effectiveness of the invalid text content judgment by using the invalid text content library.

S205: determine the invalid text content in the initial text content according to at least one invalid segment content.

Exemplarily, the invalid text content may include one or more invalid segment contents. After determining each invalid segment content in the initial text content, the corresponding invalid text content can be determined.

In a possible implementation, the invalid segment content includes at least one speech word. Determining the invalid text content in the initial text content includes: obtaining the playing duration of each speech word according to the corresponding timestamp of the speech word; determining speech words with a playing duration greater than a standard duration first duration threshold, or, speech words with a playing duration less than a standard duration second duration threshold, according to the preset standard duration and the playing duration of speech words, as the invalid text content in the initial text content.

Exemplarily, the speech words in the invalid segment content are generated by converting the speech data, which corresponds to the human voice. However, in practical applications, for the same speech word, there may be differences in the duration of human voice pronunciation, i.e. human voices are different in the dimension of pronunciation duration. Different pronunciation durations can express different semantics, which in turn determines whether speech words can express semantic information. For example, if a user utters a "um" speech for two seconds, the speech word "um" is a tone-pausing word with no specific meaning and should belong to the invalid segment content in this context; in the context of a user's conversation: "Did you have breakfast?" "Hmm. Yes." At this point, the 0.2-second speech "Hmm" represents specific semantics, so it is not an invalid segment content.

Furthermore, each speech word has a preset standard duration based on the above example, for example, 0.2 seconds. When the playing time of the determined speech word is much longer than the standard duration or much less than the standard duration, according to the timestamp corresponding to the speech word, it means that the speech word is likely to be a tone pause word and is semantically non-informative, so it can be determined as the invalid text content.

In this embodiment, the standard duration of the speech word is compared with the playing duration of the speech word to detect whether the speech word in the invalid segment content is an invalid word generated due to a pause in the tone or other reasons, thereby reducing the need for the type in different contexts. Under the misjudgment of speech words with different meanings, the recognition accuracy of the invalid text content is improved.

S206: determine the start point and end point of the speech data of each invalid segment content in the invalid text content in the audio data of the first multimedia resource.

S207: determine the first playing position of the speech data of invalid text content in the first multimedia resource according to the corresponding the start points and end points of each invalid segment content in the invalid text content.

Exemplarily, the invalid segment content includes at least one speech word, and determine the first playing position of the speech data of the invalid text content in the first multimedia resource according to the timestamp corresponding to each speech word in the invalid text content.

S208: display the invalid text content in the initial text content.

S209: play the audio segment corresponding to the invalid text content in response to operation instruction of the invalid text content.

Figure 8:
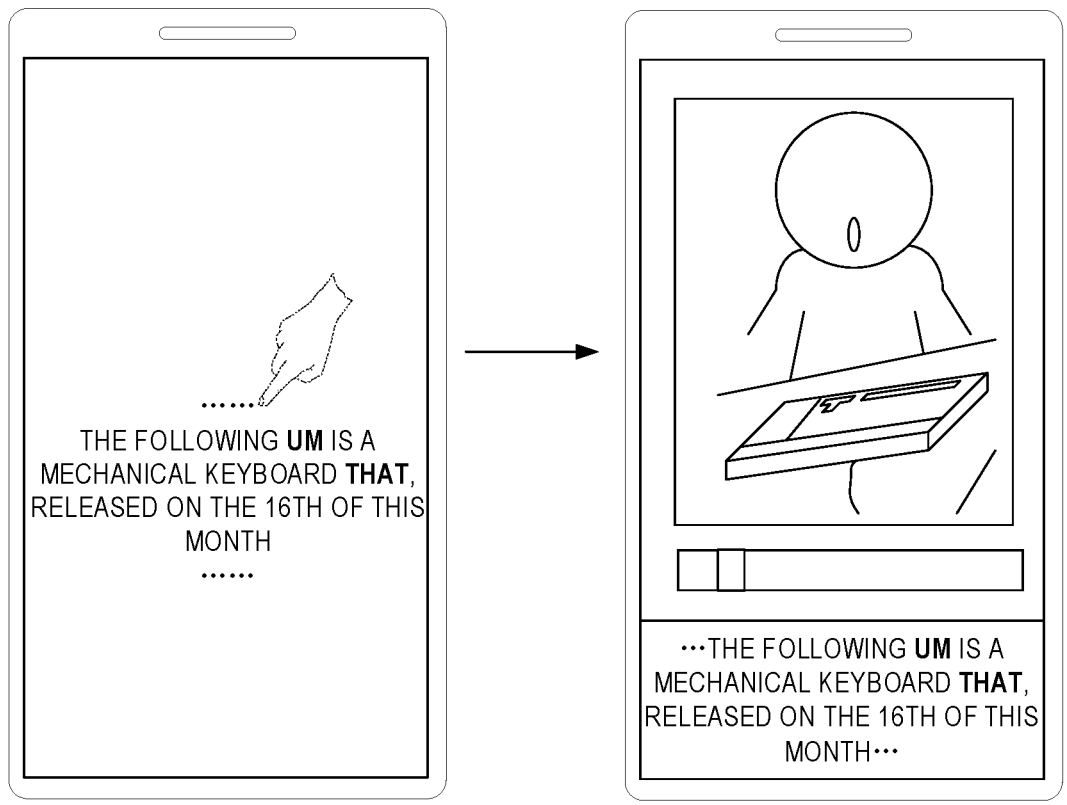
FIG. 8 illustrates a schematic diagram of an interactive interface provided by an embodiment of the disclosure.

Exemplarily, the terminal device to which the method provided in this embodiment is applied has a touchable display screen, an application (APP) for editing the first multimedia resource runs in the terminal device, and the terminal device can touch the screen to display the interactive interface of the APP. FIG. 8 illustrates a schematic diagram of an interactive interface provided by an embodiment of the disclosure. With reference to FIG. 8, the interactive interface of the terminal device displays the initial text content (FIG. 8 exemplarily shows part of "Uh, it's the latest mechanical keyboard released on the 16th of this month"), in a way of highlighting (indicated by the font in black in FIG. 8), and the invalid text content is displayed in the initial text content (i.e., "um" and "that one"). When users touch the display area corresponding to the invalid text content through the touchable display screen of the terminal device, the terminal device plays the audio and or video segments corresponding to the invalid text content so that the user can determine whether the audio segments corresponding to the invalid text content is indeed meaningless content, such as pauses and repetitions, that is semantically non-informative.

S210: determine a second playing position of the non-speech data in the first multimedia resource according to its start points and end points.

S211: obtain other text content in the initial text content, except for the invalid segment content based on the first playing position and second playing position, wherein the other text content includes at least one target segment content.

The non-speech data refers to the audio data corresponding to the non-voice part in the first multimedia resource, such as the blank part before the introduction and the blank part after the introduction in the product introduction video. The non-speech data is obtained through the voice activity detection algorithm in step S202 and will not be repeated here. Similarly, after determining the non-speech data, the corresponding playing position of the non-speech data in the first multimedia resource, i.e. the second playing position, can be obtained.

Furthermore, the non-speech data can be located according to the second playing position. Crop the first multimedia resource based on the first playing position and second playing position, to remove the speech data corresponding to invalid segment content and non-speech data in the first multimedia resource, leaving audio data corresponding to other text content, i.e. the audio data corresponding to the target segment content.

S212: add a fade-in effect at the start point of the speech data corresponding to at least one target segment content, and/or add a fade-out effect at the end of the speech data corresponding to at least one target segment content, generating transitional speech data corresponding to the target segment content.

S213: splice the transitional speech data according to the first playing position and second playing position to generate the second multimedia resource.

Furthermore, leaving at least one target segment in other text content, in order to improve the smoothness of cropped audio playing, a fade-in and fade-out effect is added to the corresponding speech data of the target segment content. Specifically, for example, adding a fade-in effect at the start point of the speech data corresponding to at least one target segment content, and adding a fade-out effect at the speech data corresponding to at least one target segment content. Herein, the fade-in effect and fade-out effect refer to adding temporal windowings at the start points and end points of the speech data, so that the corresponding speech data of a target segment begins to play, and the volume gradually increases from small to large (fade-in) or decreases from large to small (fade-out), reducing abruptness of the cropped audio data. The specific method of adding a fade-in and fade-out to an audio segment is prior art in this field and will not be repeated here.

Further, generate corresponding transitional speech data after performing fade-in and fade-out processing on the speech data corresponding to the content of the target segment. Afterwards, splice the transitional speech data according to the first playing position and the second playing position, to generate target audio data. Similarly, obtain the target video data corresponding to the target audio data according to the first playing position and the second playing position, and then generate the second multimedia resource. The second multimedia resource includes only the multimedia video corresponding to the target text content composed of the target segment content and does not include the multimedia video corresponding to the invalid text content and the multimedia video corresponding to the non-voice data. Since the second multimedia resource removes verbal errors, pauses, verbal language and other non-informative content, the content playing fluency of the second multimedia resource can be improved.

Figure 9:
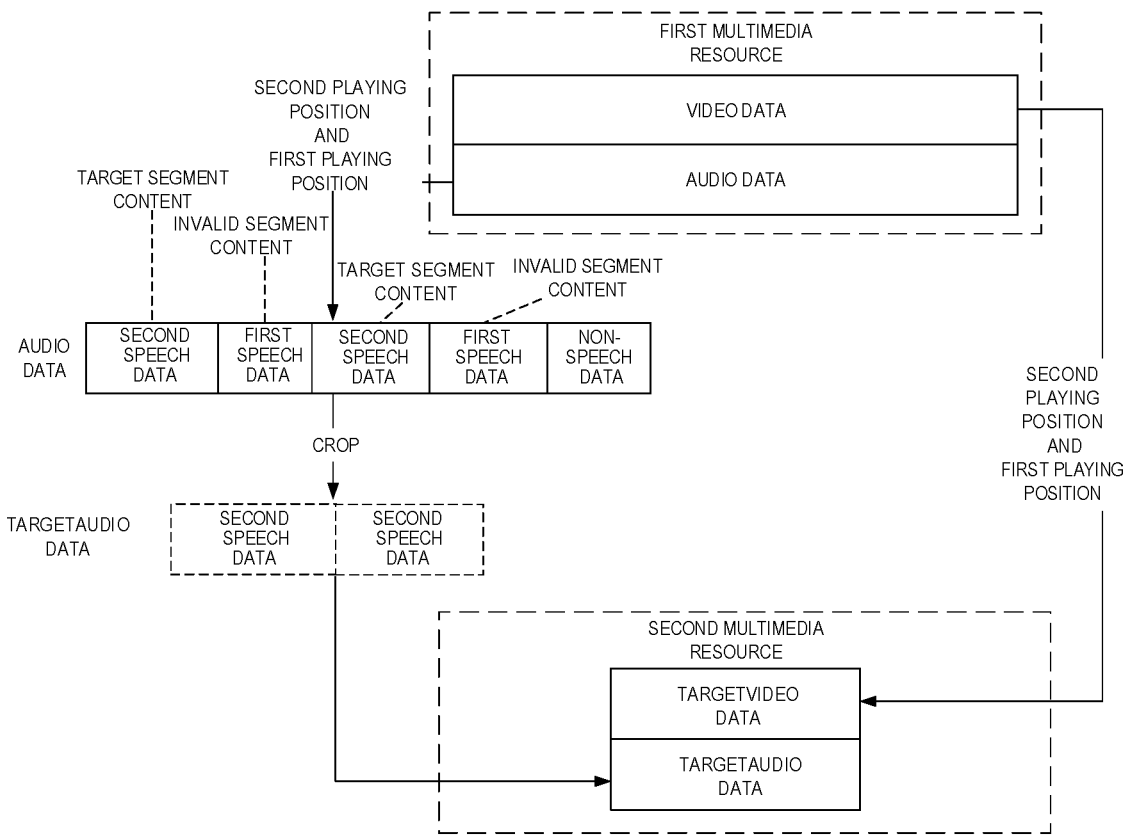
FIG. 9 illustrates another schematic diagram of the process of obtaining a second multimedia resource through a first multimedia resource according to an embodiment of the present disclosure.

FIG. 9 illustrates another schematic diagram of the process of obtaining a second multimedia resource through a first multimedia resource according to an embodiment of the present disclosure. As shown in FIG. 9, determine the speech data and non-speech data after performing the voice activity detection on the audio data of the first multimedia resource. Afterward, determine a plurality of invalid segment contents after processing steps such as speech recognition and semantic analysis on the speech data, wherein the invalid segment content corresponds to the first speech data, and the target segment content other than the invalid segment content corresponds to the second speech data. According to the first playing position corresponding to the first speech data corresponding to the invalid segment content and the second playing position corresponding to the non-speech data, crop the audio frequency data to remove the first speech data and non-speech data, and generate the target audio data corresponding to the target text content. Similarly, crop the video data according to the first playing position and second playing position to generate the target video data. Then merge the target audio data and target video data to generate the second multimedia resource.

In this embodiment, the implementation of step S201 is the same as that of step S101 in this embodiment shown in FIG. 3 of the present disclosure, and will not be repeated here.

Figure 10:
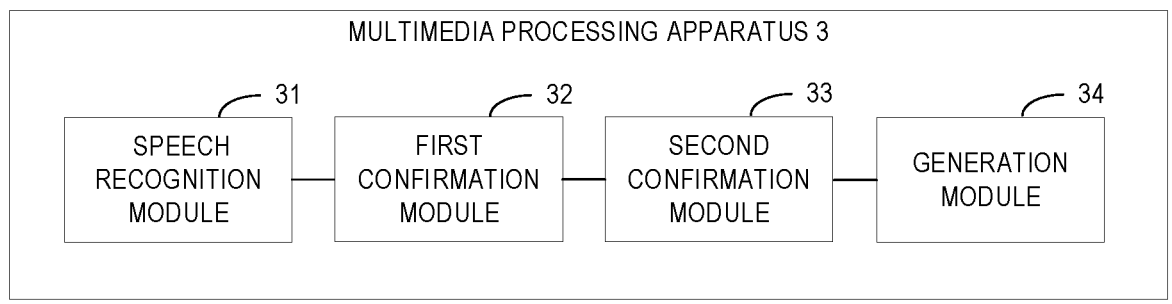
FIG. 10 illustrates a structural block diagram of a multimedia processing apparatus provided by an embodiment of the disclosure.

Corresponding to the multimedia processing method of the above embodiment, FIG. 10 illustrates a structural block diagram of a multimedia processing apparatus provided by an embodiment of the disclosure. For ease of description, only parts related to the embodiments of the present disclosure are illustrated. With reference to FIG. 10, the multimedia processing apparatus 3 includes:

a speech recognition module 31 is configured to obtain a first multimedia resource, and determine an initial text content corresponding to the first multimedia resource by performing speech recognition on the audio data of the first multimedia resource, wherein the audio data of the first multimedia resource comprises speech data of the initial text content;

a first confirmation module 32 is configured to determine the invalid text content in the initial text content, wherein the invalid text content is semantically non-informative;

a second confirmation module 33 is configured to determine the first playing position of the speech data of the invalid text content in the first multimedia resource;

a generation module 34 is configured to crop the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content.

In an embodiment of the present disclosure, the first confirmation module 32 is specifically configured to: perform semantic analysis on the initial text content to obtain semantic information corresponding to the initial text content; and determine the invalid text content in the initial text content according to the semantic information.

In an embodiment of the present disclosure, the initial text content includes a plurality of segments of content. When determining the invalid text content in the initial text content according to the semantic information, the first confirmation module 32 is specifically configured to: determine a credibility coefficient of at least one segment content in the initial text content according to the semantic information corresponding to each segment content of the initial text content. The credibility coefficient is configured to denote the credibility of the segment content as invalid text content; determine at least one invalid segment content from the at least one segment of content according to the credibility coefficient of the segment content and a preset credibility threshold; determine the invalid text content in the initial text content according to the at least one invalid segment content.

In an embodiment of the present disclosure, the second confirmation module 33 is specifically configured to: determine the start point and end point of the speech data of each invalid segment content in the audio data of the first multimedia resource; determine the first playing position of the speech data of the invalid text content in the first multimedia resource according to the content of each invalid segment corresponding to the start point and end point.

In an embodiment of the present disclosure, the generation module 34 is specifically configured to: obtain other text content in the initial text content except for the invalid segment content based on the first playing position, wherein the other text content includes at least one target segment content; add a fade-in effect at the start point of the speech data corresponding to at least one target segment content, and/or add a fade-out effect at the end of the speech data corresponding to at least one target segment content, generating transitional speech data corresponding to the target segment content; splice the transitional speech data according to the first playing position to generate the second multimedia resource.

In an embodiment of the present disclosure, before semantic analysis is performed on the initial text content to obtain semantic information corresponding to the initial text content, the first confirmation module 32 is also configured to: determine the initial invalid text content in the text content based on preset invalid text content library; when the first confirmation module 32 performs semantic analysis on the initial text content to obtain semantic information corresponding to the initial text content, it is specifically configured to: if there is no invalid text content in the invalid text content database, then the initial text content is subjected to semantic analysis to obtain semantic information corresponding to the initial text content; after determining the invalid text content in the initial text content according to the semantic information, the first confirmation module 32 is also configured to: adding the invalid text content, determined based on the semantic information, to the invalid text content library.

In an embodiment of the present disclosure, before cropping the first multimedia resource based on the first playing position to obtain the second multimedia resource, the generation module 34 is further configured to: display the invalid text content in the initial text content; play the audio segment corresponding to the invalid text content in response to operation instruction of the invalid text content.

In an embodiment of the present disclosure, the speech recognition module 31 determines an initial text content corresponding to the first multimedia resource by performing speech recognition on audio data of the first multimedia resource, it is specifically configured to: recognize speech data and non-speech data in the audio data of the first multimedia resource through a voice activity detection VAD algorithm; determine the initial text content corresponding to the first multimedia resource by performing a speech recognition on the speech data in the audio data of the first multimedia resource.

In an embodiment of the present disclosure, the second confirmation module 33 is further configured to: determine a second playing position of the non-speech data in the first multimedia resource according to its start points and end points; the generation module 34, is specifically configured to: crop the first multimedia resource based on the first playing position and second playing position to obtain the second multimedia resource, wherein the second multimedia resource does not include non-voice data.

In an embodiment of the present disclosure, the speech recognition module 31 determines an initial text content corresponding to the first multimedia resource by performing speech recognition on audio data of the first multimedia resource, it is specifically configured to: perform speech recognition on audio data of the first multimedia resource to obtain a plurality of speech words and their corresponding timestamps according to automatic speech recognition (ASR) technology. The timestamps represent the playing position of the audio data corresponding to the speech words in the first multimedia resource; generate the initial text content according to a plurality of speech words; the second confirmation module 33 is specifically configured to: determine the first playing position of the speech data of the invalid text content in the first multimedia resource according to the timestamp corresponding to each speech word in the invalid text content.

In an embodiment of the present disclosure, the first confirmation module 32 is specifically configured to: obtain the playing duration of each speech word according to the corresponding timestamp of the speech word; determine speech words with a playing duration greater than a standard duration first duration threshold, or, speech words with a playing duration less than a standard duration second duration threshold, according to the preset standard duration and the playing duration of speech words, as the invalid text content in the initial text content.

In an embodiment of the present disclosure, the first multimedia resource further includes the video data, and the generation module 34 is specifically configured to: crop the audio data and video data of the first multimedia resource based on the first playing position to obtain the second multimedia resource.

The multimedia processing apparatus 3 provided in this embodiment can be configured to execute the technical solution of the above method embodiment, and its implementation principle and technical effect are similar, and will not be repeated here in this embodiment.

Figure 11:
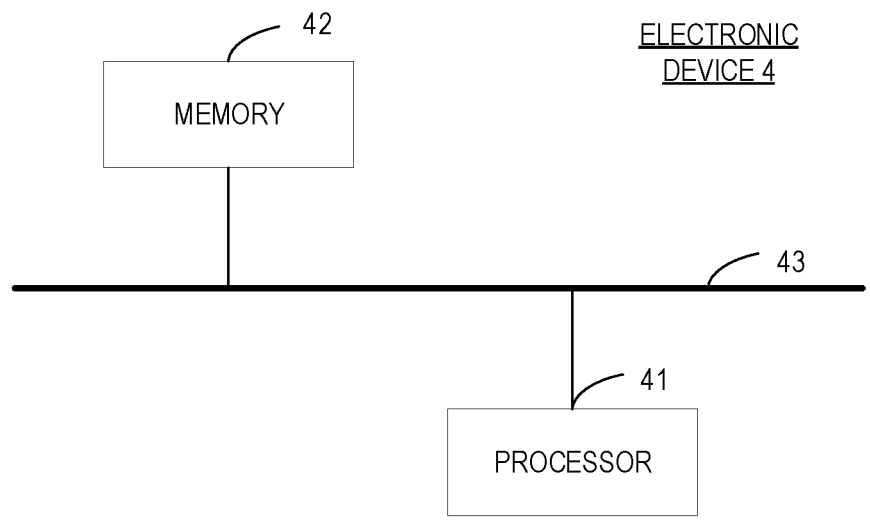
FIG. 11 illustrates a structural schematic diagram of an electronic device provided by an embodiment of the disclosure.

FIG. 11 illustrates a structural schematic diagram of an electronic device provided by an embodiment of the disclosure. As shown in FIG. 11, the electronic device 4 includes at least one processor 41 and memory 42;
  the memory 42 stores computer execution instructions;
  at least one processor 41 executes computer execution instructions stored in memory 42, causing at least one processor 41 to execute the multimedia processing method shown in the embodiments of FIG. 2 to FIG. 7.
Herein, the processor 41 and the memory 42 are connected by a bus 43.

The related description can be understood by referring to the related description and effects corresponding to the steps in the embodiments corresponding to FIG. 2 to FIG. 7, and it will not be repeated here.

Figure 12:
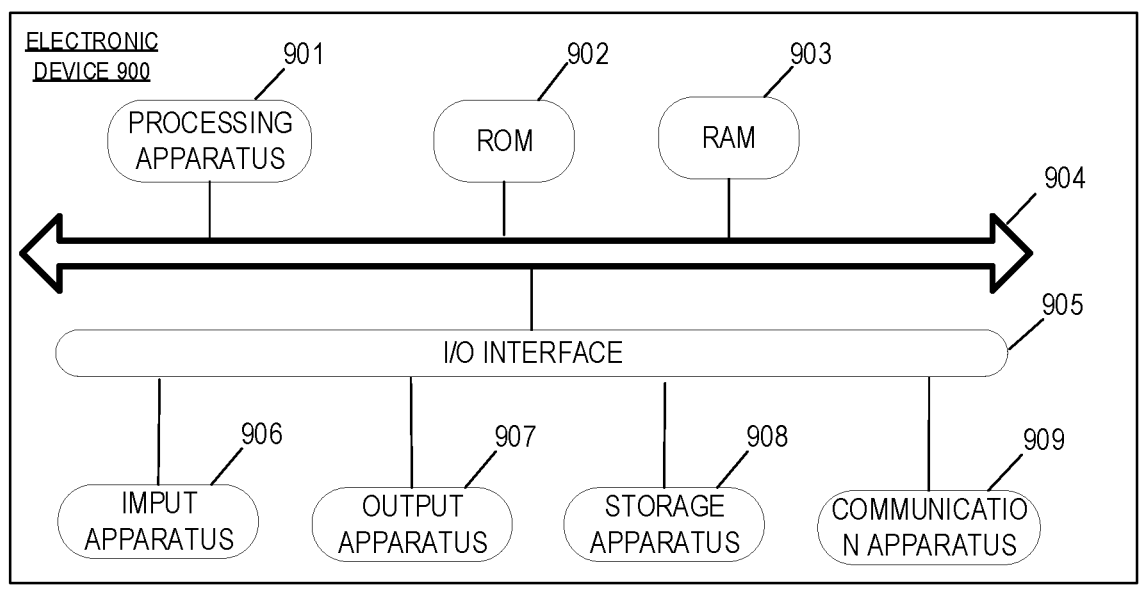
FIG. 12 illustrates a structural schematic diagram of the hardware structure of an electronic device provided by an embodiment of the disclosure.

With reference to FIG. 12, it illustrates a schematic structural diagram of an electronic device 900 suitable for implementing embodiments of the present disclosure, and the electronic device 900 may be a terminal device or a server. Herein, terminal devices can include but are not limited to mobile phones, laptops, digital broadcasting receivers, Personal Digital Assistant (PDA), Portable Android Device (PAD), Portable Media Player (PMP), Mobile terminals such as car navigation terminals, as well as fixed terminals such as digital television (TV) and desktop computers. The electronic device shown in FIG. 12 is only an example and should not bring any limitation to the function and scope of use of the embodiments of the present disclosure.

As shown in FIG. 12, the electronic device 900 can include a processing apparatus (such as a central processing unit, graphics processor, etc.) 901, which can perform various appropriate actions and processes according to a program stored in a read-only memory (Read Only Memory, ROM for short) 902 or loaded from a storage apparatus 908 into a random access memory (Random Access Memory, RAM for short) 903. In the RAM 903, various programs and data required for the operation of the electronic device 900 are also stored. The processing apparatus 901, the ROM 902, and the RAM 903 are connected to each other through the bus 904. An Input/Output (I/O) interface 905 is also connected to bus 904.

Generally, the following apparatuses can be connected to the I/O interface 905: including an input apparatus 906 such as touch screens, touch pads, keyboards, mice, cameras, microphones, accelerometers, gyroscopes, etc.; including, for example, liquid crystal displays (Liquid Crystal Display, LCD for short), an output apparatus 907 such as a speaker, a vibrator, etc.; a storage apparatus 908 such as a magnetic tape, a hard disk, etc.; and a communication apparatus 909. The communication apparatus 909 may allow the electronic device 900 to perform wireless or wired communication with other devices to exchange data. Although FIG. 12 illustrates the electronic device 900 with various apparatuses, it should be understood that it is not required to implement or have all of the illustrated apparatuses. Alternatively, more or fewer apparatuses may be implemented or provided.

Specifically, according to the embodiments of the present disclosure, the process described above with reference to the flow diagram can be implemented as a computer software program. For example, an embodiment of the present disclosure includes a computer program product, which includes a computer program carried on a computer-readable medium, and the computer program includes a program code for executing the method shown in the flowchart. In such embodiments, the computer program can be downloaded and installed from the network through the communication apparatus 909, installed from the storage apparatus 908, or installed from the ROM 902. When the computer program is executed by the processing apparatus 901, the above functions defined in the embodiment of the present disclosure are executed.

It should be noted that the computer-readable medium mentioned in the present disclosure can be a computer-readable signal medium, a computer-readable storage medium, or any combination of the two. The computer-readable storage medium can be, for example, but not limited to, an electrical, magnetic, optical, electromagnetic, infrared, or semiconductor system, apparatus, or device, or a combination of any of the above. More specific examples of the computer-readable storage medium may include but are not limited to electrical connections with one or more wires, portable computer disks, hard disks, random access memory (RAM), read-only memory (ROM), erasable programmable read-only memory (EPROM or flash memory), optical fiber, portable compact disc read-only memory (CD-ROM), optical storage devices, magnetic storage devices, or any suitable combination of the above. In the present disclosure, a computer-readable storage medium may be any tangible medium that contains or stores a program, which may be used by or in combination with an instruction execution system, apparatus, or device. In the present disclosure, the computer-readable signal medium may include data signals propagated in the baseband/or as part of the carrier, wherein a computer-readable program code is carried. The propagation of data signals can adopt various forms, including but not limited to electromagnetic signals, optical signals, or any suitable combination of the above. The computer-readable signal medium can also be any computer-readable medium other than a computer-readable storage medium. The computer-readable signal medium may send, propagate, or transmit programs for use by or in combination with instruction execution systems, apparatuses, or devices. The program code contained on the computer-readable medium can be transmitted by any suitable medium, including but not limited to wire, optical cable, RF (Radio Frequency), etc., or any suitable combination of the above.

The computer-readable medium may be included in the electronic device, or it may exist alone without being assembled into the electronic device.

The computer-readable medium carries one or more programs, and when one or more programs are executed by the electronic device, the electronic device is caused to execute the method shown in the embodiment.

The computer program code used to perform the operations of the present disclosure may be written in one or more programming languages or a combination thereof. The programming languages include object-oriented programming languages—such as Java, Smalltalk, and C++, and also conventional procedural programming languages—such as "C" language or similar programming languages. The program code can be executed entirely on the user's computer, partly on the user's computer, executed as an independent software package, partly on the user's computer, partly executed on a remote computer, or entirely executed on the remote computer or server. In the case of a remote computer, the remote computer can be connected to the user's computer through any kind of network-including a Local Area Network (LAN) or a Wide Area Network (WAN)—or, it can be connected to an external computer (for example, using an Internet service provider to connect via the Internet).

The flow diagrams and block diagrams in the accompanying drawings illustrate the possible impossible architecture, functions, and operations of systems, methods, and computer program products according to various embodiments in the present disclosure. At this point, each block in a flow diagram or block diagram can represent a module, program segment, or part of code that contains one or more executable instructions for implementing specified logical functions. It should also be noted that in some alternative implementations, the functions indicated in the blocks can also occur in a different order than those indicated in the accompanying drawings. For example, two consecutive blocks can actually be executed in parallel, and sometimes they can also be executed in the opposite order, depending on the function involved. It should also be noted that each block in the block diagram and/or flow diagram, as well as the combination of blocks in the block diagram and/or flow diagram, can be implemented using dedicated hardware-based systems that perform specified functions or operations or can be implemented using a combination of dedicated hardware and computer instructions.

The units involved in the embodiments described in the present disclosure may be implemented by way of software or by way of hardware. Herein, the name of the unit does not constitute a limitation on the unit itself under certain circumstances. For example, a first obtaining unit can also be described as "a unit for obtaining at least two Internet Protocol addresses."

The functions described above may be at least partially executed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include but is not limited to, an electronic, magnetic, optical, electromagnetic, infrared, or semiconductor system, apparatus, or device, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In a first aspect, a multimedia processing method is provided in embodiments of the present disclosure. The method comprises: obtaining a first multimedia resource; determining an initial text content corresponding to the first multimedia resource by performing speech recognition on audio data of the first multimedia resource, wherein the audio data of the first multimedia resource comprises speech data of the initial text content; determining an invalid text content in the initial text content, wherein the invalid text content is semantically non-informative; determining a first playing position of the speech data of the invalid text content in the first multimedia resource; cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content.

According to one or more embodiments of the present disclosure, determining an invalid text content in the initial text content comprises: performing a semantic analysis on the initial text content to obtain semantic information corresponding to the initial text content; determining the invalid text content in the initial text content according to the semantic information.

According to one or more embodiments of the present disclosure, the initial text content comprises a plurality of segment content, and determining the invalid text content in the initial text content according to the semantic information comprises: determining a credibility coefficient of at least one segment content of the initial text content according to the semantic information corresponding to the initial text content, wherein the credibility coefficient is used for denoting credibility that the segment content is the invalid text content; determining at least one invalid segment content from the at least one segment content according to the credibility coefficient of the segment content and a preset credibility threshold; determining the invalid text content in the initial text content according to the at least one invalid segment content.

According to one or more embodiments of the present disclosure, determining a first playing position of the speech data of the invalid text content in the first multimedia resource comprises: determining a start point and an end point of the speech data of each invalid segment content in the audio data of the first multimedia resource; determining the first playing position of the speech data of the invalid text content in the first multimedia resource based on the start point and the end point corresponding to each invalid segment content.

According to one or more embodiments of the present disclosure, cropping the first multimedia resource based on the first playing position to obtain a second multimedia resource comprises: obtaining other text content in the initial text content than the invalid segment content based on the first playing position, wherein the other text content comprises at least one target segment content; adding a fade-in effect at a start point of speech data corresponding to the at least one target segment content, and/or adding a fade-out effect at an end point of the speech data corresponding to the at least one target segment content, to generate transition speech data corresponding to the target segment content; splicing the transition speech data according to the first playing position to generate the second multimedia resource.

According to one or more embodiments of the present disclosure, before performing the semantic analysis on the initial text content to obtain the semantic information corresponding to the initial text content, the method further comprises: determining the invalid text content in the initial text content based on a preset invalid text content library; performing semantic analysis on the initial text content to obtain semantic information corresponding to the initial text content comprises: performing semantic analysis on the initial text content to obtain the semantic information corresponding to the initial text content if the invalid text content does not exist in the invalid text content library; after determining the invalid text content in the initial text content based on the semantic information, the method further comprises: adding the invalid text content determined based on the semantic information to the invalid text content library.

According to one or more embodiments of the present disclosure, before cropping the first multimedia resource based on the first playing position to obtain the second multimedia resource further comprises: displaying the invalid text content in the initial text content; playing an audio segment corresponding to the invalid text content in response to an action instruction for the invalid text content.

According to one or more embodiments of the present disclosure, determining an initial text content corresponding to the first multimedia resource by performing speech recognition on audio data of the first multimedia resource comprises: recognizing speech data and non-speech data in the audio data of the first multimedia resource through a voice activity detection VAD algorithm; determining the initial text content corresponding to the first multimedia resource by performing a speech recognition on the speech data in the audio data of the first multimedia resource.

According to one or more embodiments of the present disclosure, the method further comprises: determining a second playing position of the non-speech data in the first multimedia resource according to a start point and end point of the non-speech data; cropping the first multimedia resource based on the first playing position to obtain a second multimedia resource comprises: cropping the first multimedia resource based on the first playing position and the second playing position to obtain the second multimedia resource, wherein the second multimedia resource does not comprise the non-speech data.

According to one or more embodiments of the present disclosure, determining an initial text content corresponding to the first multimedia resource by performing speech recognition on audio data of the first multimedia resource comprises: performing, according to an automatic speech recognition ASR technique, a speech recognition on the audio data of the first multimedia resource to obtain a plurality of speech words and a timestamp corresponding to each of the speech words, the timestamp denoting a playing position of audio data corresponding to the speech word in the first multimedia resource; generating the initial text content according to the a plurality of speech words; determining a first playing position of the speech data of the invalid text content in the first multimedia resource comprises: determining the first playing position of the speech data of the invalid text content in the first multimedia resource according to a timestamp corresponding to each of the speech words in the invalid text content.

According to one or more embodiments of the present disclosure, determining the invalid text content in the initial text content comprises: obtaining a duration of each of the speech words according to a timestamp corresponding to the speech word; determining, according to a preset standard duration and a duration of the speech word, a speech word with a duration greater than the standard duration by a first duration threshold or a speech word with a duration less than the standard duration by a second duration threshold as the invalid text content in the initial text content.

According to one or more embodiments of the present disclosure, the first multimedia resource further comprises video data, and cropping the first multimedia resource based on the first playing position to obtain a second multimedia resource comprises: cropping the audio data and the video data of the first multimedia resource based on the first playing position to obtain the second multimedia resource.

In a second aspect, according to one or more embodiments of the present disclosure, a multimedia processing apparatus is provided, comprising:

a speech recognition module configured to obtain a first multimedia resource, and determine an initial text content corresponding to the first multimedia resource by performing speech recognition on the audio data of the first multimedia resource, wherein the audio data of the first multimedia resource comprises speech data of the initial text content;

a first confirmation module configured to determine the invalid text content in the initial text content, wherein the invalid text content is semantically non-informative;

a second confirmation module configured to determine the first playing position of the speech data of the invalid text content in the first multimedia resource;

a generation module configured to crop the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content.

According to one or more embodiments of the present disclosure, the first confirmation module is specifically configured to: perform a semantic analysis on the initial text content to obtain semantic information corresponding to the initial text content; determine the invalid text content in the initial text content according to the semantic information.

According to one or more embodiments of the present disclosure, the initial text content comprises a plurality of segment content. The first confirmation module, when determining the invalid text content in the initial text content according to the semantic information, is specifically configured to: determine a credibility coefficient of at least one segment content of the initial text content according to the semantic information corresponding to the initial text content, wherein the credibility coefficient is used for denoting credibility that the segment content is the invalid text content; determine at least one invalid segment content from the at least one segment content according to the credibility coefficient of the segment content and a preset credibility threshold; determine the invalid text content in the initial text content according to the at least one invalid segment content.

According to one or more embodiments of the present disclosure, the second confirmation module is specifically configured to: determine a start point and an end point of the speech data of each invalid segment content in the audio data of the first multimedia resource; determine the first playing position of the speech data of the invalid text content in the first multimedia resource based on the start point and the end point corresponding to each invalid segment content.

According to one or more embodiments of the present disclosure, the generation module is specifically configured to: obtain other text content in the initial text content than the invalid segment content based on the first playing position, wherein the other text content comprises at least one target segment content; add a fade-in effect at a start point of speech data corresponding to the at least one target segment content, and/or adding a fade-out effect at an end point of the speech data corresponding to the at least one target segment content, to generate transition speech data corresponding to the target segment content; splice the transition speech data according to the first playing position to generate the second multimedia resource.

According to one or more embodiments of the present disclosure, before performing the semantic analysis on the initial text content to obtain the semantic information corresponding to the initial text content, the first confirmation module is further configured to: determine the invalid text content in the initial text content based on a preset invalid text content library; when the first confirmation module performs a semantic analysis on the initial text content to obtain semantic information corresponding to the initial text content, it is specifically configured to: perform a semantic analysis on the initial text content to obtain the semantic information corresponding to the initial text content if the invalid text content does not exist in the invalid text content library; after the first confirmation module determines the invalid text content in the initial text content based on the semantic information, it is further configured to: add the invalid text content determined based on the semantic information to the invalid text content library.

According to one or more embodiments of the present disclosure, before cropping the first multimedia resource based on the first playing position to obtain the second multimedia resource, the generation module is further configured to: display the invalid text content in the initial text content; play an audio segment corresponding to the invalid text content in response to an action instruction for the invalid text content.

According to one or more embodiments of the present disclosure, when the speech recognition module determines an initial text content corresponding to the first multimedia resource by performing speech recognition on audio data of the first multimedia resource, it is specifically configured to: recognize speech data and non-speech data in the audio data of the first multimedia resource through a voice activity detection VAD algorithm; determine the initial text content corresponding to the first multimedia resource by performing a speech recognition on the speech data in the audio data of the first multimedia resource.

According to one or more embodiments of the present disclosure, the second confirmation module is further configured to: determine a second playing position of the non-speech data in the first multimedia resource according to a start point and end point of the non-speech data; and crop the first multimedia resource based on the first playing position to obtain a second multimedia resource comprises: cropping the first multimedia resource based on the first playing position and the second playing position to obtain the second multimedia resource, wherein the second multimedia resource does not comprise the non-speech data.

According to one or more embodiments of the present disclosure, when the speech recognition module determines an initial text content corresponding to the first multimedia resource by performing speech recognition on audio data of the first multimedia resource, it is specifically configured to: perform, according to an automatic speech recognition ASR technique, a speech recognition on the audio data of the first multimedia resource to obtain a plurality of speech words and a timestamp corresponding to each of the speech words, the timestamp denoting a playing position of audio data corresponding to the speech word in the first multimedia resource; generate the initial text content according to the plurality of speech words; the second module is specifically configured to: determine the first playing position of the speech data of the invalid text content in the first multimedia resource according to a timestamp corresponding to each of the speech words in the invalid text content.

According to one or more embodiments of the present disclosure, the first confirmation module is specifically configured to: obtain a duration of each of the speech words according to a timestamp corresponding to the speech word; determine, according to a preset standard duration and a duration of the speech word, a speech word with a duration greater than the standard duration by a first duration threshold or a speech word with a duration less than the standard duration by a second duration threshold as the invalid text content in the initial text content.

According to one or more embodiments of the present disclosure, the first multimedia resource further comprises video data, and the generation module is specifically configured to: crop the audio data and the video data of the first multimedia resource based on the first playing position to obtain the second multimedia resource.

In a third aspect, according to one or more embodiments of the present disclosure, an electronic device is provided, comprising: at least one processor and memory; the memory storing computer-executable instructions; the at least one processor executing the computer-executable instructions stored in the memory to cause the at least one processor to implement the multimedia processing method according to the above first aspect and various possible designs of the first aspect.

In a fourth aspect, according to one or more embodiments of the present disclosure, a computer-readable storage medium is provided. The computer-readable storage medium stores computer-executable instructions, that, when executed by a processor, implement the multimedia processing method according to the first aspect and various possible designs of the first aspect.

In a fifth aspect, a computer program product is provided in embodiments of the present disclosure, comprising a computer program, which, when executed by a processor, implements the method according to the first aspect and various possible designs of the first aspect.

In a sixth aspect, a computer program is provided in embodiments of the present disclosure, wherein the computer program, when executed by a processor, implements the method according to the first aspect and various possible designs of the first aspect.

Furthermore, although each operation is depicted in a specific order, this should not be understood as requiring them to be executed in the specific order shown or in a sequential order. Under certain circumstances, multitasking and parallel processing may be advantageous. Similarly, although several specific implementation details are included in the above discussion, these should not be interpreted as limiting the scope of the present disclosure. Some features described in the context of individual embodiments can also be combined and implemented in a single embodiment. On the contrary, various features described in the context of a single embodiment can also be implemented individually or in any suitable sub-combination in a plurality of embodiments.

Although the subject matter has been described in language specific to structural features and/or method logical actions, it should be understood that the subject matter limited in the accompanying claims may not necessarily be limited to the specific features or actions described above. On the contrary, the specific features and actions described above are only exemplary forms of implementing the claims.

What is claimed is:

1. A multimedia processing method comprising:
obtaining a first multimedia resource;
determining an initial text content corresponding to the first multimedia resource by performing speech recognition on audio data of the first multimedia resource, wherein the audio data of the first multimedia resource comprises speech data of the initial text content;
determining an invalid text content in the initial text content, wherein the invalid text content is semantically non-informative;
determining a first playing position of the speech data of the invalid text content in the first multimedia resource; and
cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content,
wherein determining the initial text content corresponding to the first multimedia resource by performing speech recognition on audio data of the first multimedia resource comprises:
performing, according to an automatic speech recognition ASR technique, a speech recognition on the audio data of the first multimedia resource to obtain a plurality of speech words and a timestamp corresponding to each of the speech words, the timestamp denoting a playing position of audio data corresponding to the speech word in the first multimedia resource, and
generating the initial text content according to the speech words, and wherein determining the first playing position of the speech data of the invalid text content in the first multimedia resource comprises:
determining the first playing position of the speech data of the invalid text content in the first multimedia resource according to a timestamp corresponding to each of the speech words in the invalid text content.

2. The method of claim 1, wherein determining the invalid text content in the initial text content comprises:
performing a semantic analysis on the initial text content to obtain semantic information corresponding to the initial text content; and
determining the invalid text content in the initial text content according to the semantic information.

3. The method of claim 2, wherein the initial text content comprises a plurality of segment content, and determining the invalid text content in the initial text content according to the semantic information comprises:
determining a credibility coefficient of at least one segment content of the initial text content according to the semantic information corresponding to the initial text content, wherein the credibility coefficient is used for denoting credibility that the segment content is the invalid text content;
determining at least one invalid segment content from the at least one segment content according to the credibility coefficient of the segment content and a preset credibility threshold; and
determining the invalid text content in the initial text content according to the at least one invalid segment content.

4. The method of claim 3, wherein determining the first playing position of the speech data of the invalid text content in the first multimedia resource comprises:
determining a start point and an end point of the speech data of each invalid segment content in the audio data of the first multimedia resource; and
determining the first playing position of the speech data of the invalid text content in the first multimedia resource based on the start point and the end point corresponding to each invalid segment content.

5. The method of claim 3, wherein cropping the first multimedia resource based on the first playing position to obtain the second multimedia resource comprises:
obtaining other text content in the initial text content than the invalid segment content based on the first playing position, wherein the other text content comprises at least one target segment content;
adding a fade-in effect at a start point of speech data corresponding to the at least one target segment content, and/or adding a fade-out effect at an end point of the speech data corresponding to the at least one target segment content, to generate transition speech data corresponding to the target segment content; and
splicing the transition speech data according to the first playing position to generate the second multimedia resource.

6. The method of claim 2, wherein before performing the semantic analysis on the initial text content to obtain the semantic information corresponding to the initial text content, the method further comprises:
determining the invalid text content in the initial text content based on a preset invalid text content library;
performing a semantic analysis on the initial text content to obtain semantic information corresponding to the initial text content comprises:

performing a semantic analysis on the initial text content to obtain the semantic information corresponding to the initial text content if the invalid text content does not exist in the invalid text content library;

after determining the invalid text content in the initial text content based on the semantic information, the method further comprises:

adding the invalid text content determined based on the semantic information to the invalid text content library.

7. The method of claim 1, wherein before cropping the first multimedia resource based on the first playing position to obtain the second multimedia resource, further comprises:

displaying the invalid text content in the initial text content; and playing an audio segment corresponding to the invalid text content in response to an operation instruction for the invalid text content.

8. The method of claim 1, wherein determining the initial text content corresponding to the first multimedia resource by performing speech recognition on the audio data of the first multimedia resource comprises:

recognizing speech data and non-speech data in the audio data of the first multimedia resource through a voice activity detection VAD algorithm; and determining the initial text content corresponding to the first multimedia resource by performing a speech recognition on the speech data in the audio data of the first multimedia resource.

9. The method of claim 8, wherein the method further comprises:

determining a second playing position of the non-speech data in the first multimedia resource according to a start point and end point of the non-speech data; and cropping the first multimedia resource based on the first playing position to obtain a second multimedia resource comprises:

cropping the first multimedia resource based on the first playing position and the second playing position to obtain the second multimedia resource, wherein the second multimedia resource does not comprise the non-speech data.

10. The method of claim 1, wherein determining the invalid text content in the initial text content comprises:

obtaining a duration of each of the speech words according to a timestamp corresponding to the speech word; and determining, according to a preset standard duration and a duration of the speech word, a speech word with a duration greater than the standard duration by a first duration threshold or a speech word with a duration less than the standard duration by a second duration threshold as the invalid text content in the initial text content.

11. The method of claim 1, wherein the first multimedia resource further comprises video data, and cropping the first multimedia resource based on the first playing position to obtain the second multimedia resource comprises:

cropping the audio data and the video data of the first multimedia resource based on the first playing position to obtain the second multimedia resource.

12. An electronic device, comprising: at least one processor and memory;

the memory storing computer-executable instructions; and the at least one processor executing the computer-executable instructions stored in the memory to cause the at least one processor to implement a multimedia processing method comprising:

obtaining a first multimedia resource;

determining an initial text content corresponding to the first multimedia resource by performing speech recognition on audio data of the first multimedia resource, wherein the audio data of the first multimedia resource comprises speech data of the initial text content;

determining an invalid text content in the initial text content, wherein the invalid text content is semantically non-informative;

determining a first playing position of the speech data of the invalid text content in the first multimedia resource; and cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content, wherein determining the initial text content corresponding to the first multimedia resource by performing speech recognition on audio data of the first multimedia resource comprises:

performing, according to an automatic speech recognition ASR technique, a speech recognition on the audio data of the first multimedia resource to obtain a plurality of speech words and a timestamp corresponding to each of the speech words, the timestamp denoting a playing position of audio data corresponding to the speech word in the first multimedia resource, and generating the initial text content according to the speech words, and wherein determining the first playing position of the speech data of the invalid text content in the first multimedia resource comprises:

determining the first playing position of the speech data of the invalid text content in the first multimedia resource according to a timestamp corresponding to each of the speech words in the invalid text content.

13. The electronic device of claim 12, wherein determining the invalid text content in the initial text content comprises:

performing a semantic analysis on the initial text content to obtain semantic information corresponding to the initial text content; and determining the invalid text content in the initial text content according to the semantic information.

14. The electronic device of claim 13, wherein the initial text content comprises a plurality of segment content, and determining the invalid text content in the initial text content according to the semantic information comprises:

determining a credibility coefficient of at least one segment content of the initial text content according to the semantic information corresponding to the initial text content, wherein the credibility coefficient is used for denoting credibility that the segment content is the invalid text content;

determining at least one invalid segment content from the at least one segment content according to the credibility coefficient of the segment content and a preset credibility threshold; and determining the invalid text content in the initial text content according to the at least one invalid segment content.

15. The electronic device of claim 14, wherein determining the first playing position of the speech data of the invalid text content in the first multimedia resource comprises:
    determining a start point and an end point of the speech data of each invalid segment content in the audio data of the first multimedia resource; and
    determining the first playing position of the speech data of the invalid text content in the first multimedia resource based on the start point and the end point corresponding to each invalid segment content.

16. The electronic device of claim 14, wherein cropping the first multimedia resource based on the first playing position to obtain the second multimedia resource comprises:
    obtaining other text content in the initial text content than the invalid segment content based on the first playing position, wherein the other text content comprises at least one target segment content;
    adding a fade-in effect at a start point of speech data corresponding to the at least one target segment content, and/or adding a fade-out effect at an end point of the speech data corresponding to the at least one target segment content, to generate transition speech data corresponding to the target segment content; and
    splicing the transition speech data according to the first playing position to generate the second multimedia resource.

17. The electronic device of claim 13, wherein before performing the semantic analysis on the initial text content to obtain the semantic information corresponding to the initial text content, the method further comprises:
    determining the invalid text content in the initial text content based on a preset invalid text content library;
    performing a semantic analysis on the initial text content to obtain semantic information corresponding to the initial text content comprises:
    performing a semantic analysis on the initial text content to obtain the semantic information corresponding to the initial text content if the invalid text content does not exist in the invalid text content library;
    after determining the invalid text content in the initial text content based on the semantic information, the method further comprises:
    adding the invalid text content determined based on the semantic information to the invalid text content library.

18. The electronic device of claim 12, wherein before cropping the first multimedia resource based on the first playing position to obtain the second multimedia resource, the method further comprises:
    displaying the invalid text content in the initial text content; and
    playing an audio segment corresponding to the invalid text content in response to an operation instruction for the invalid text content.

19. A non-transitory computer-readable storage medium, wherein the non-transitory computer-readable storage medium stores computer-executable instructions, that, when executed by a processor, implements the multimedia processing method comprising:
    obtaining a first multimedia resource;
    determining an initial text content corresponding to the first multimedia resource by performing speech recognition on audio data of the first multimedia resource, wherein the audio data of the first multimedia resource comprises speech data of the initial text content;
    determining an invalid text content in the initial text content, wherein the invalid text content is semantically non-informative;
    determining a first playing position of the speech data of the invalid text content in the first multimedia resource; and
    cropping the first multimedia resource based on the first playing position to obtain a second multimedia resource, wherein audio data of the second multimedia resource comprises speech data of a target text content but does not comprise speech data of the invalid text content, wherein the target text content is other text content in the initial text content than the invalid text content,
    wherein determining the initial text content corresponding to the first multimedia resource by performing speech recognition on audio data of the first multimedia resource comprises:
        performing, according to an automatic speech recognition ASR technique, a speech recognition on the audio data of the first multimedia resource to obtain a plurality of speech words and a timestamp corresponding to each of the speech words, the timestamp denoting a playing position of audio data corresponding to the speech word in the first multimedia resource, and
        generating the initial text content according to the speech words, and
    wherein determining the first playing position of the speech data of the invalid text content in the first multimedia resource comprises:
        determining the first playing position of the speech data of the invalid text content in the first multimedia resource according to a timestamp corresponding to each of the speech words in the invalid text content.

* * * * *